Figure 15:
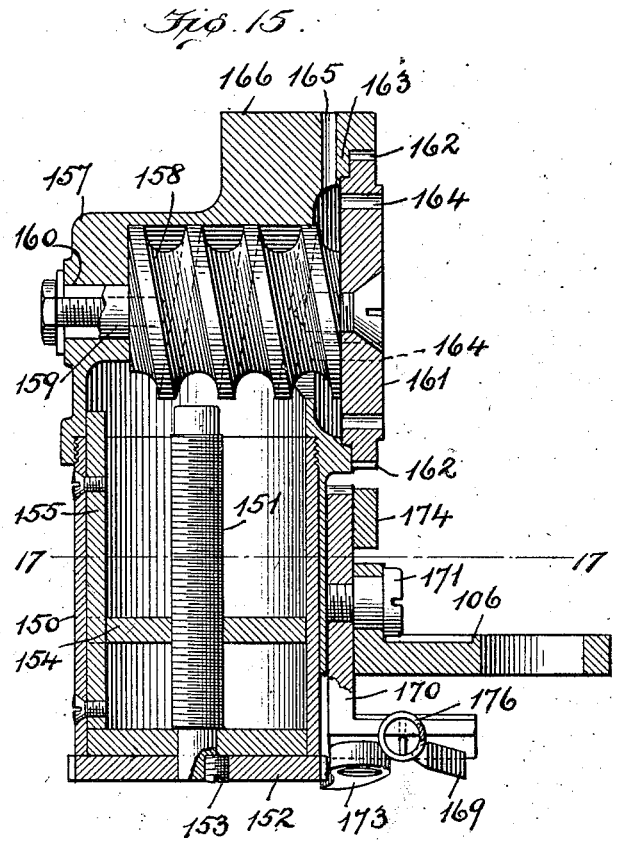

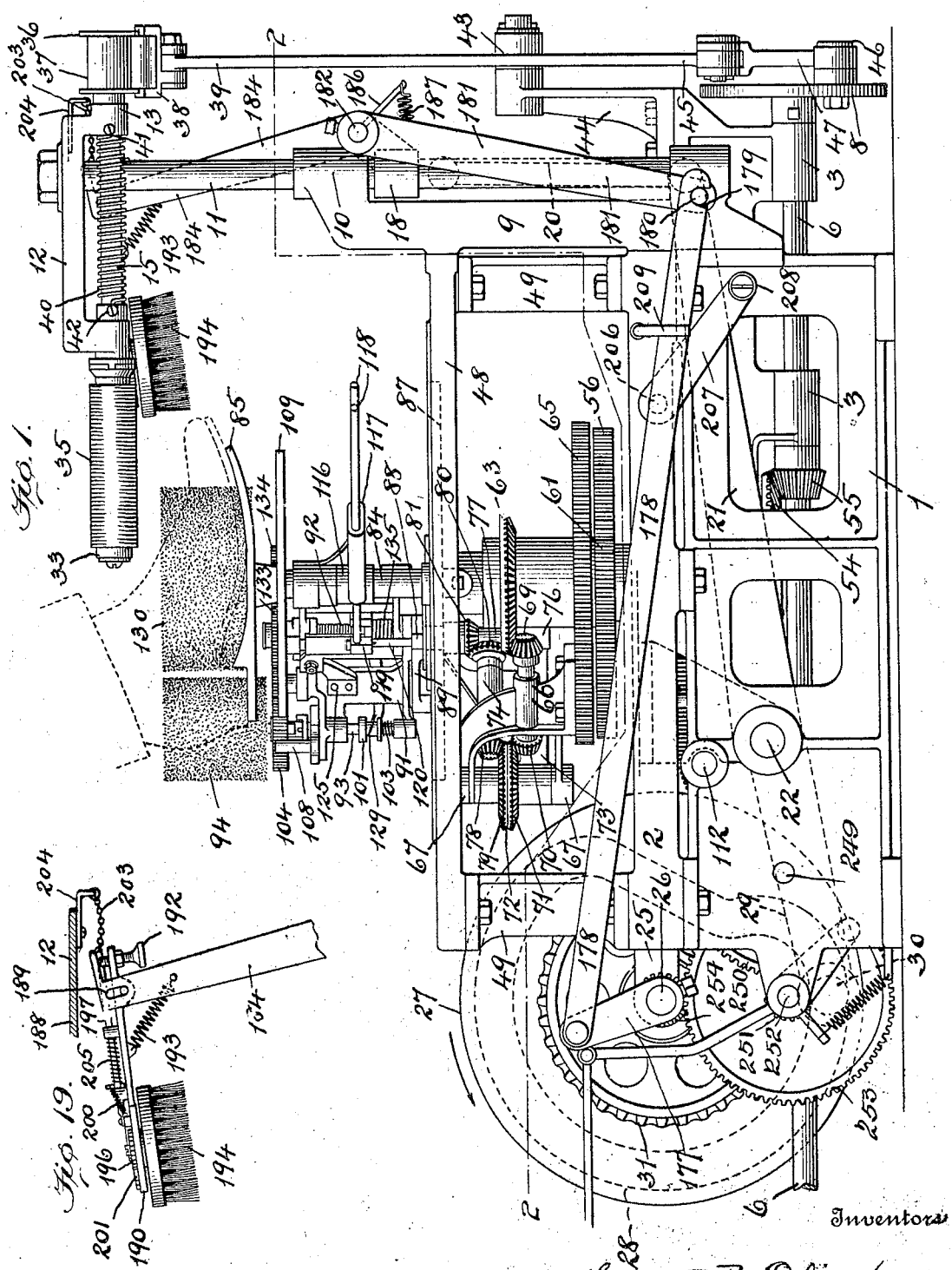

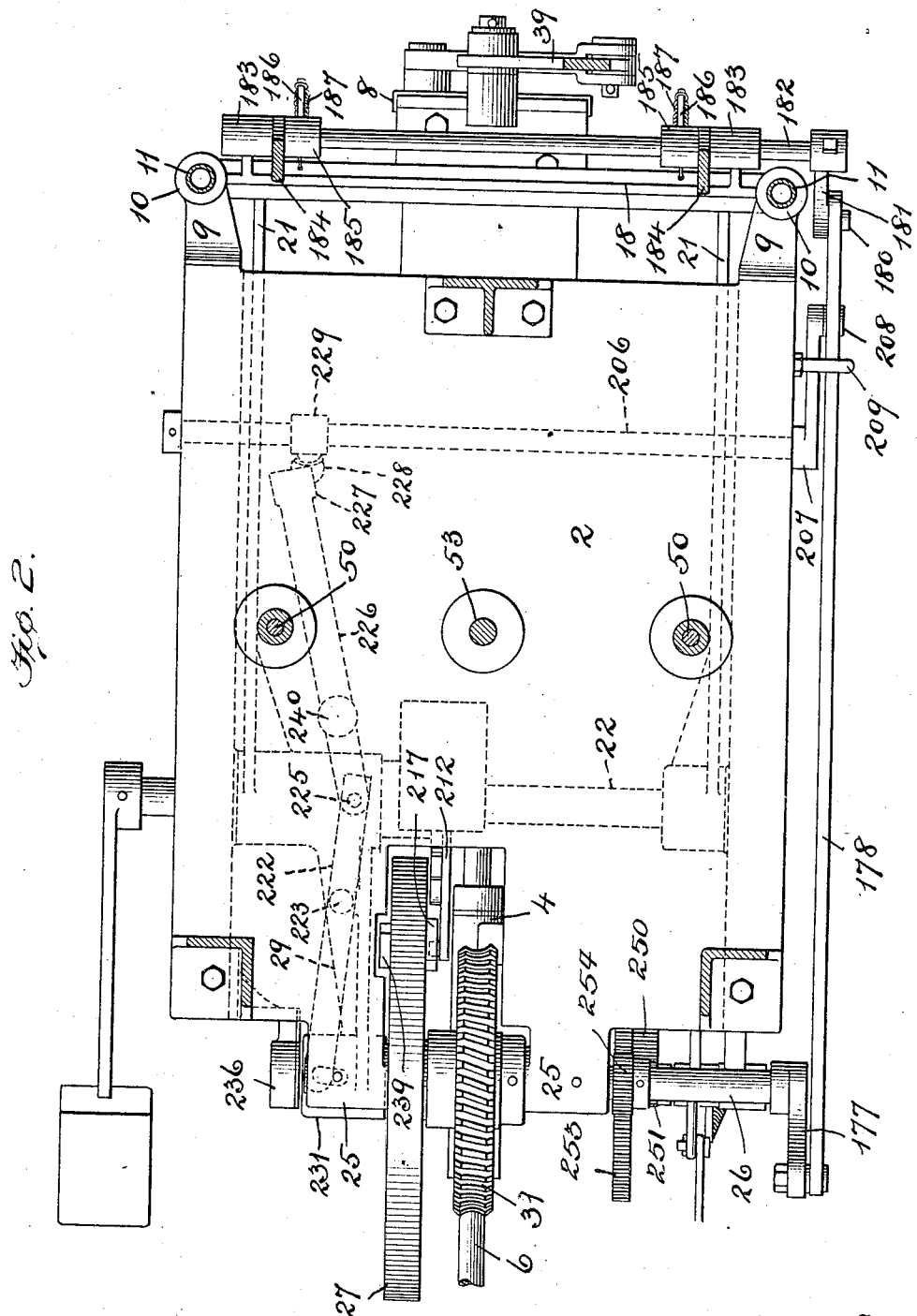

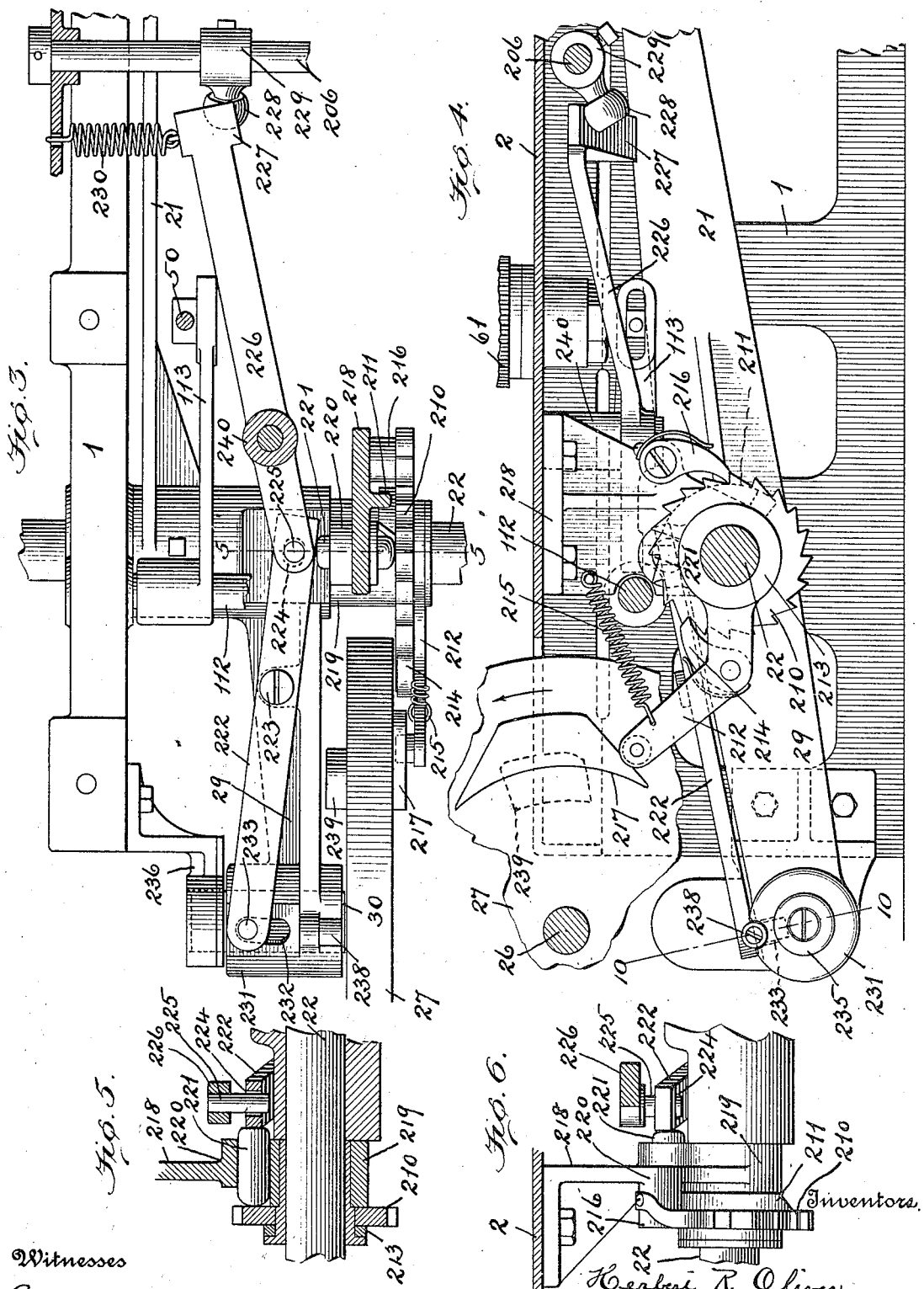

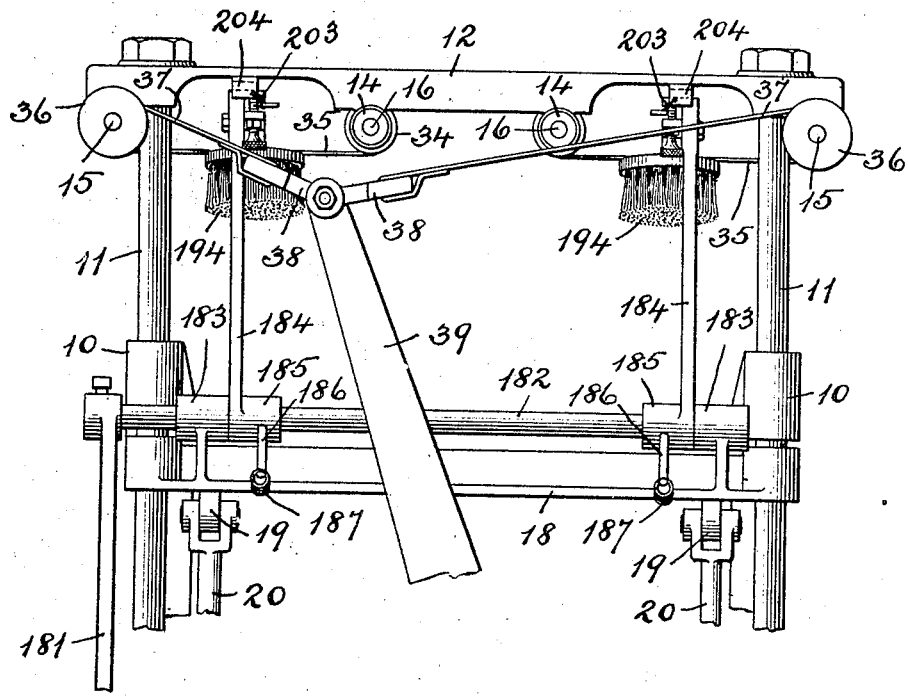

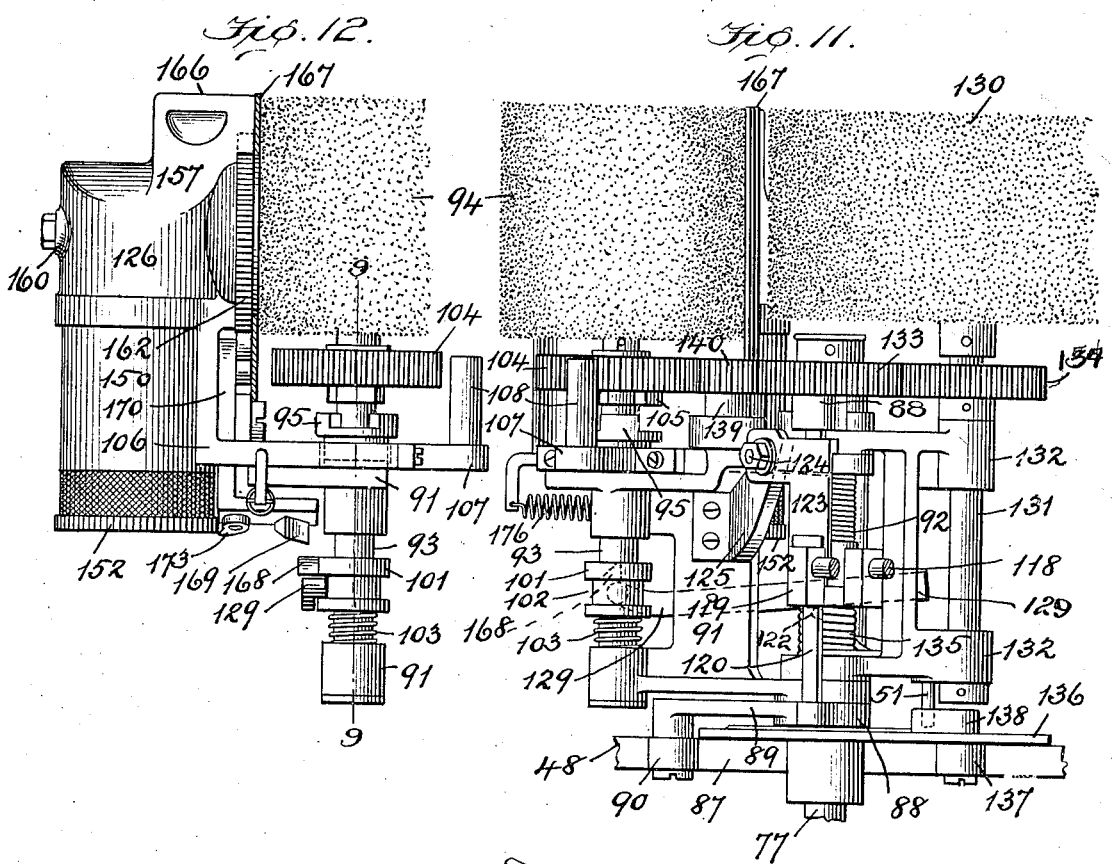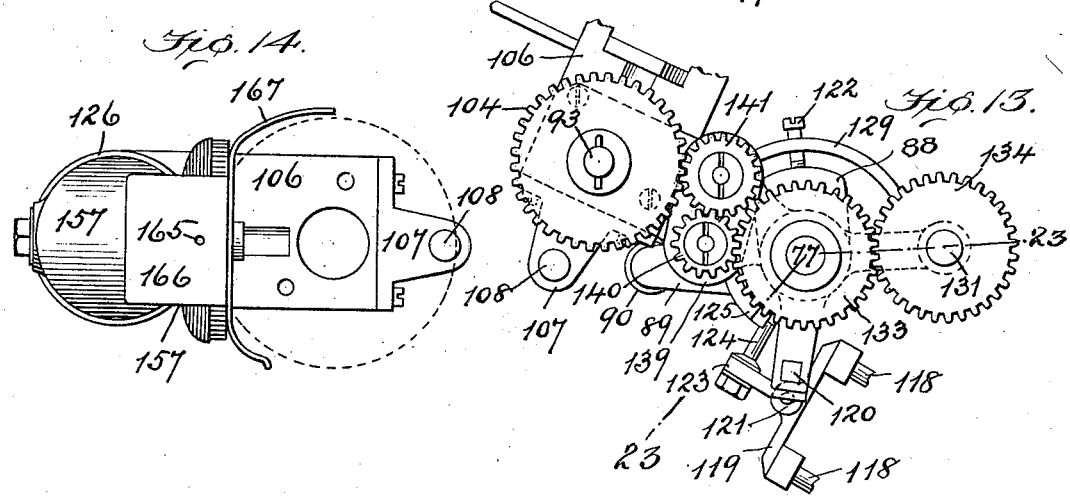

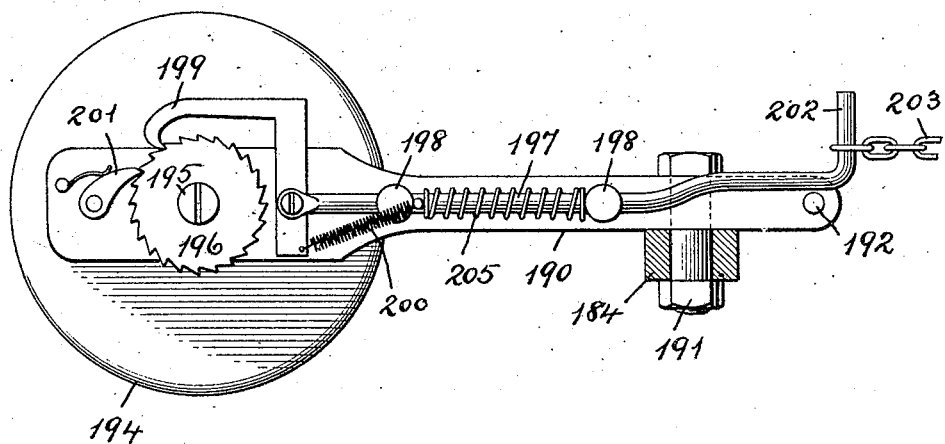
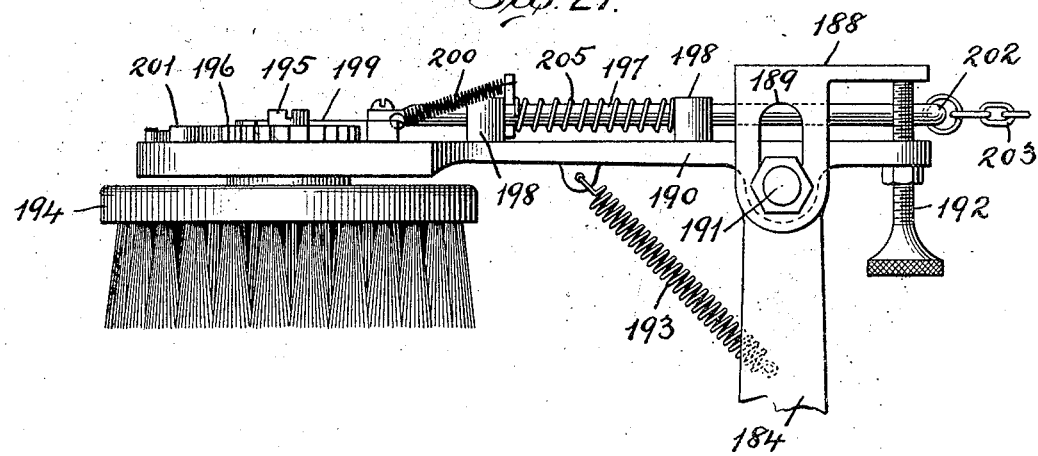

Fig. 23.
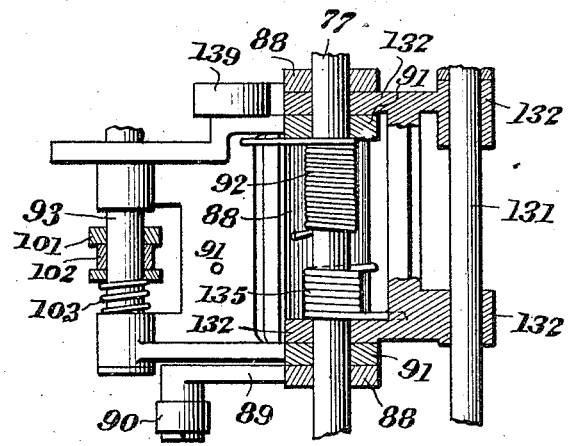
Fig. 22.
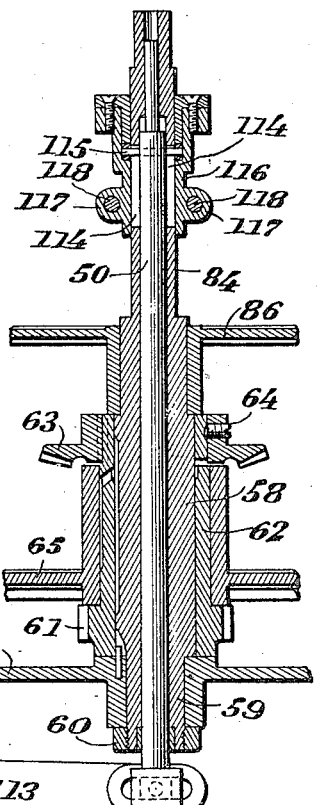
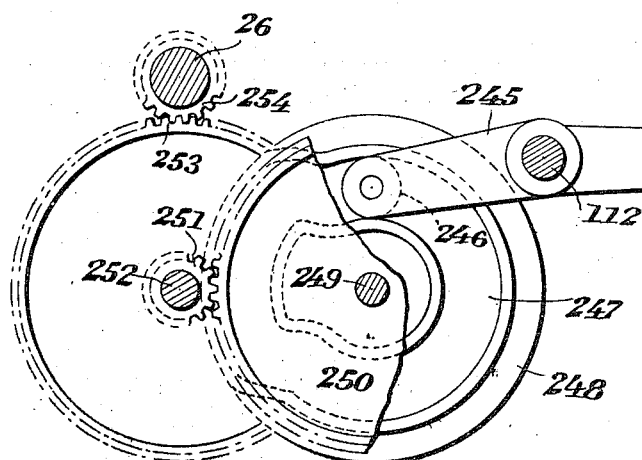

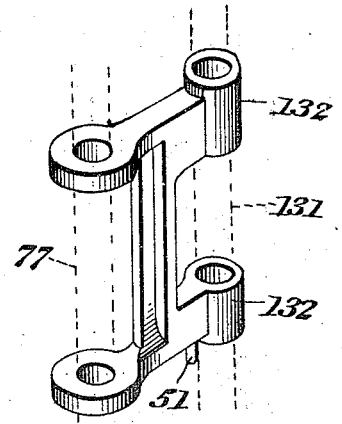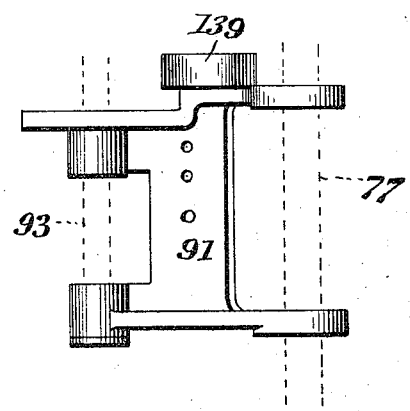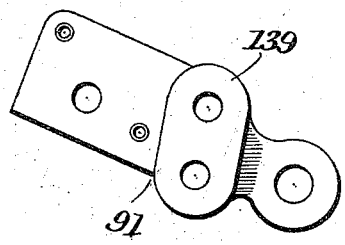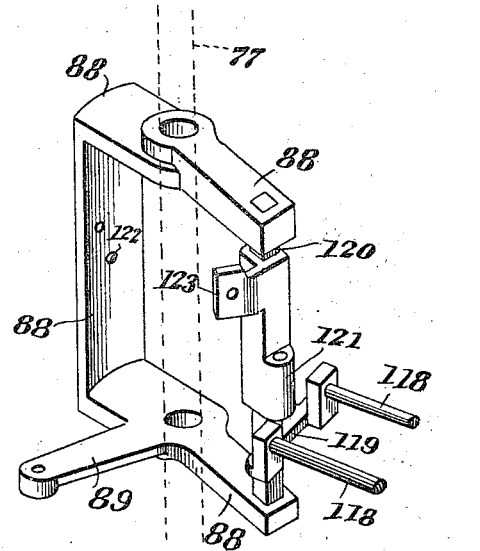

UNITED STATES PATENT OFFICE.

HERBERT R. OLIVER AND GEORGE P. OHLGART, OF BALTIMORE, MARYLAND, ASSIGNORS, BY DIRECT AND MESNE ASSIGNMENTS, TO THE AMERICAN AUTOMATIC SHOE POLISHING MACHINE COMPANY, OF BALTIMORE, MARYLAND, A CORPORATION OF NEW JERSEY.

SHOE-POLISHING MACHINE.

1,131,613.  Specification of Letters Patent.  Patented Mar. 9, 1915.

Application filed September 5, 1911. Serial No. 647,735.

*To all whom it may concern:*

Be it known that we, HERBERT R. OLIVER and GEORGE P. OHLGART, citizens of the United States, residing at Baltimore, in the State of Maryland, have invented certain new and useful Improvements in Shoe-Polishing Machines, of which the following is a specification.

This invention relates to machines for polishing boots or shoes and has particular reference to and is an improvement on the machine shown and described in Letters Patent of the United States No. 1,055,979, granted March 11th, 1913, wherein a side polishing device is employed to polish the sides and extreme ends of the shoes and a toe-polisher operates to polish the front or toe portion of the shoes.

The present invention is a direct improvement on the machine shown in said Letters Patent 1,055,979 of March 11th, 1913, and the machine illustrated in the drawings of the present case in large part is substantially the same as that disclosed in said patent of March 11th, 1913 and for this reason it is deemed unnecessary to set forth herein a detailed explanation of the machine in full.

An object of the present invention is to provide an improved mechanism for delivering polish to the brushes and to care for and protect the polish or paste from the direct action of the atmosphere, and A further object of the present invention is to provide an improved mechanism for collecting and applying the polish material to the front or toe portion of the boots or shoes.

Figure 16:
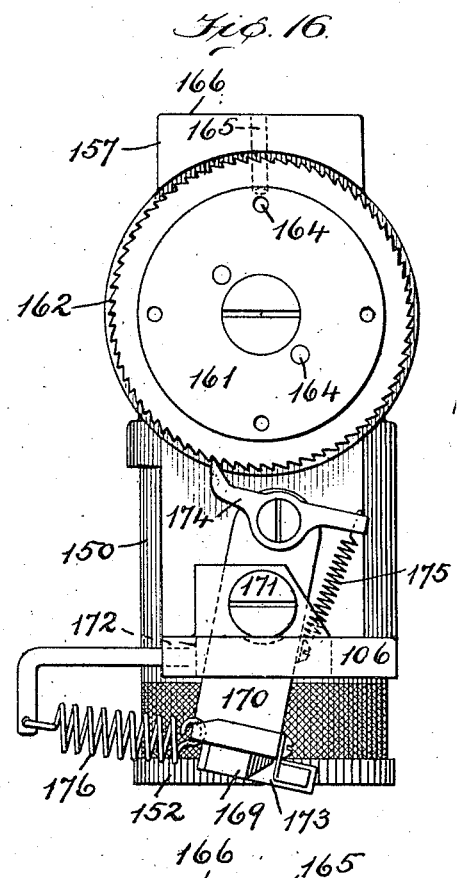
Figure 17:
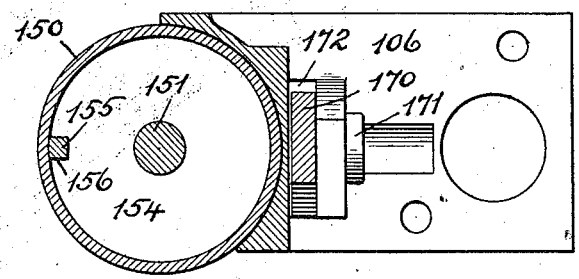
Figure 18:
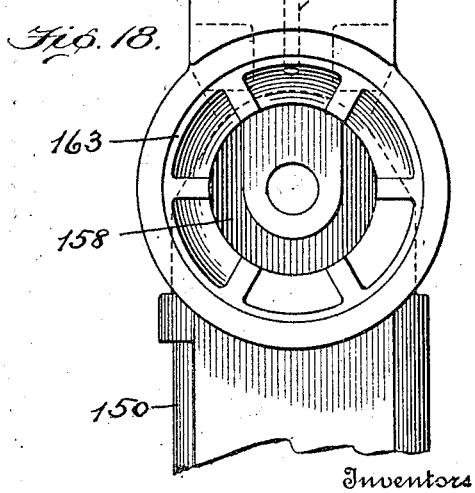

With these and other objects in view the accompanying drawings illustrate the invention wherein, Figure 1, shows a side elevation of the improved machine. Fig. 2, a horizontal sectional plan of the same,—the section being taken on the line 2—2 of Fig. 1. Fig. 3, is a top plan view of the mechanism for controlling the movement of the toe-polisher and the brush that applies the polish to the toe of the shoe. Fig. 4, is a side elevation of the same. Figs. 5 and 6, are details of the mechanism for actuating the controlling mechanism shown in Figs. 3 and 4. Fig. 7, shows a front elevation of the toe-polisher devices and the brushes that distribute the polish on the toe of the shoe. Fig. 8, shows in perspective, a detail of the upper end of the arm that carries the toe polish-applying brush. Fig. 9, is a vertical section through the brackets and devices that effect an operation of polish-applying brush for the sides of the shoe,—the section being taken on the line 9—9 of Fig. 12. Fig. 10, is a vertical cross-section on the line 10—10 of Fig. 4. Figs. 11 and 12, show two elevations respectively of the devices that carry the side polisher and the polish receptacle. Figs. 13 and 14 are top plan views respectively of the same. Fig. 15, shows on an enlarged scale a vertical section through the polish receptacle. Fig. 16, shows the same in side elevation. Fig. 17, is a horizontal cross-sectional view through the polish receptacle taken on the line 17—17 of Fig. 15. Fig. 18, shows a front view of the polish receptacle similar to the view shown in Fig. 16, but with the outer cut-off plate or disk removed. Fig. 19, shows the toe polish-applying brush and the upper end of the arm that carries the same. Figs. 20 and 21 are top plan and side elevations respectively of the toe polish-applying brush. Fig. 22, shows a vertical sectional detail through one of the tubular supports which carry the gears that drive the polisher brushes and also shows the lever and cam mechanism that actuate a vertical rod in the support to move the brushes toward and from the shoe. Fig. 23, illustrates a vertical sectional detail through the parts carried on the polisher shaft,—the section being taken on the line 23—23 of Fig. 13, and Figs. 24, 25, 26 and 27 show details of the several yoke frames all of which are carried on the polisher shaft.

Referring to the drawings the numeral, 1, designates the vertical side frames which support a horizontal bed plate, 2. Suitable bracket bearings, 3, and 4, are secured to the bottom side of the bed plate and hang pendantly therefrom so as to sustain a main horizontal driving shaft, 6, which has a central position between the said two side frames. The inner end of this driving shaft may be driven in any suitable manner but preferably by an electric motor, not shown, while the outer end of said shaft carries a circular crank wheel, 8, which revolves in a vertical plane adjacent to the front edge of the bed plate. Vertical brackets, 9, are provided at opposite corners of the bed plate adjacent the front edge thereof and have tubular sleeves, 10, at their upper and lower ends respectively. These two brackets, 9, have position at opposite sides of the central driving shaft, 6, and serve to sustain the toe polishing mechanisms as will presently be explained.

It should be understood that the machine shown in the accompanying drawings is provided with two complete sets of side and toe polishers and that both sets are operated and driven from the same central horizontal driving shaft. These two sets of polishing devices are therefore positioned at opposite sides of the main driving shaft so that both shoes may be operated upon and polished simultaneously. As both sets of polishing mechanisms have precisely the same construction and operation, like reference characters will be applied to each, and a separate and duplicate description of them will be unnecessary.

By reference to Figs. 1, 2 and 7 it will be seen that the tubular sleeves, 10, of the brackets, 9, sustain rods, 11, which extend vertically therein so as to have movement therethrough, and that the upper ends of said rods carry a plate or table, 12, which extends horizontally and across the front of the machine. This plate or table is provided on its bottom side with suitable bearings, 13, and 14, which sustain horizontal toe-polisher shafts, 15, and 16, respectively. A bar, 18, extends horizontally between and connects the vertical rods, 11, as clearly seen in Fig. 7, and said bar and rods are movable vertically together. Suitable lugs, 19, are provided on the bar, 18, at opposite ends thereof, so that the upper ends of links, 20, may be pivotally connected thereto while the lower ends of the links are pivotally connected with the forward ends of levers, 21. These levers are sustained from a horizontal rock-shaft, 22, which has bearing in the vertical side frames, 1. It will thus be understood that the bar, 18, rods, 11, and plate or table, 12, are all sustained from the rock-shaft, 22, by the levers, 21, and that as the shaft is rocked the plate or table will be raised or lowered as desired.

By reference to Figs. 1 and 2 it will be seen that the bed plate, 2, carries spaced-apart horizontal bracket bearings, 25, at its rear end and that a horizontal shaft, 26, is sustained in said bearings. This shaft carries a large cam, 27, which is provided with a groove, 28, and the rock-shaft, 22, carries a bracket arm, 29, that extends rearwardly at the grooved side of the cam and has a pin, 30, that may be projected into said cam groove and will presently be more fully described. By means of this grooved cam and bracket arm, the shaft, 22, is rocked, and the plate or table, 12, raised or lowered. The shaft, 26, carries a worm gear, 31, which is driven by a worm on the main driving shaft, 6.

By reference to Figs. 1 and 7 it will be noted that the table, 12, sustains the horizontal shafts, 15, and 16, which carry rolls, 33, and 34, and that a flexible band or fabric strip, 35, has one end wound on one of said rolls and its other end wound on the other roll. Each shaft, 15, carries a pulley or reel, 36, each of which has one end of a band, 37, attached to and wound about it, while the other ends of said bands are connected to swiveled clips, 38, which are carried on the upper end of a vertical rock bar or lever, 39, as will presently be more fully described. It will therefore be seen that if bar or lever, 39, is swung in one direction one fabric strip, 35, will be wound upon roll, 34, on one shaft, 16, while at the same time the other fabric strip, 35, will be unwound from the roll, 34, of the other shaft, 16, but the movement of said lever or bar at all times causes both fabric strips, 35, to travel horizontally from one roll onto the other. To effect this winding and unwinding of the fabric strips, 35, and the travel of the same horizontally back and forth between the rolls, 33, and 34, we provide the shafts, 15, and 16, with coiled springs, 40, which encircle the shafts and have one end, 41, rigidly attached to a stationary point, such as the bearings, 13, and 14, while the opposite end, 42, of each spring is made fast to the revolving shaft or the roll that revolves with the shaft and on which the end of the fabric strip, 35, is wound. By this arrangement it will be seen that if shaft, 15, or 16, is turned in one direction the coiled spring, 40, will be wound thereon and placed under tension so that when released it will cause the shaft to revolve in the other direction.

By reference to Fig. 1 it will be noted that rock bar or lever, 39, is pivotally sustained at, 43, to a suitable bracket, 44, at the front of the machine and in a central vertical plane over the horizontal shaft, 6, and that the lower end, 45, of said bar or lever extends to one side of said central vertical plane and at an angle with respect to the upper end thereof.

The crank wheel or plate, 8, at the forward end of the shaft, 6, is provided with a wrist pin, 46, and a link, 47, has one end engaging the crank pin and its other end pivotally connected to the lower end, 45, of the rock bar or lever, 39. By means of this arrangement the rotary motion of the crank wheel or plate, 8, is utilized to impart a reciprocating swinging movement to the upper end, 39, of the rock bar or lever and consequently the bands, 37, are alternately drawn from around the reels, 36, which effects a revolution of the shafts, 15, and a winding of the polisher strips, 35, onto the rolls, 33. When the lever, 39, moves in the opposite direction or toward said reels, 36, the springs, 40, will operate to wind the bands, 37, onto the reels and to also wind the polisher strips, 35, onto the rolls, 34, of shafts, 16. Thus at each stroke of the lever, 39, to the right the polisher strips, 35, will travel horizontally to the left while the movement of lever, 39, to the left will cause said strips, 35, to travel horizontally to the right.

From the foregoing description it is to be understood that while the polisher strips, 35, are being reciprocated horizontally they are also movable vertically with the table, 12, which table is intermittently raised and lowered with the vertical rods, 11, by the rocking of levers, 21; rock-shaft, 22, and lever-arm, 29, through the revolution of the cam, 27. The flexible bands, 37, readily permit the table to rise and lower with respect to rock bar or lever, 39, which drives the polisher strips.

It is to be understood that the machine illustrated in the accompanying drawings is designed to operate on both shoes and effect a polishing of the sides, heels and toes in one operation, and to effect this, in addition to the toe-polishing mechanism heretofore described, there is provided two side polishing mechanisms,—one for each shoe. These side polishing mechanisms are alike in construction and in the present instance include brush devices that travel in a circuit and have an orbital movement about the shoes. A pinion, 55, is provided on the main driving shaft, 6, which meshes with and drives a bevel gear, 54, on a central vertical shaft, 53. The vertical shaft, 53, extends up through the bed plate, 2, and carries a large gear, 56, which meshes with pinions, 61, on vertical tubular supports that extend above the table, 2, and each of which latter carry a side polisher mechanism. These side polisher mechanisms are located at opposite sides of the central gear, 56, so that the latter may drive both side polishers. At opposite sides of the central gear 56, the bed plate 2, sustains vertical tubular supports 58, which are alike in construction and each of which sustains a side polishing mechanism. A vertical sectional detail through one of these supports is shown in Fig. 22 of the drawings, to which particular reference will now be made. The lower end of the tubular support 58, is reduced in diameter and has a threaded end 59, that projects through an opening in the base plate 2, and is held in a rigid vertical position by means of a nut 60, on the lower end thereof. A pinion 61, is mounted on the tubular support immediately above the base plate 2, and meshes with and is driven by the central gear 56. This pinion has a sleeve portion 62, which projects vertically on and around the tubular support and the upper end of said sleeve carries a horizontal bevel gear 63, which revolves with the sleeve and the pinion 61. The pinion 61, and bevel gear 63, revolve at a comparatively high speed while in a horizontal plane between them there is a horizontal gear 65, which is loosely mounted on sleeve 62, and is driven at a comparatively low rate of speed by a pinion that is carried on the shaft 53, on top of gear 56.

By reference to Fig. 1 it will be noted that the horizontal gear, 65, is provided on its upper side with a bracket bearing, 66, which is rigidly secured thereto, and the outer end of which is provided with vertically spaced-apart bearings, 67. A horizontal shaft, 68, is mounted in the bearing, 66, and is provided with a beveled pinion, 69, that meshes with and is driven by the beveled gear, 63, on the tubular support. The outer end of the shaft, 68, is also provided with a pinion, 70, which meshes with the lower teeth, 71, of a double-faced gear, 72, carried in the vertical bearings, 67. An arm or bracket, 73, is mounted between the bearings, 67, and below the gear, 72, and is capable of swinging with respect thereto and said arm carries a horizontal bearing, 74, through which a shaft extends. The outer end of the bearing, 74, sustains a vertical shaft, 77, on which a bevel gear, 81, is mounted. The horizontal shaft in bearing, 74, is provided at one end with a pinion, 78, that meshes with upper teeth, 79, on the double faced gear, 72, and the opposite end of said shaft carries another pinion, 80, which meshes with and drives a bevel gear, 81, on the vertical shaft, 77.

From the foregoing description it is to be understood that the horizontal shaft, 75, the vertical shaft, 77, and the driving mechanism connecting them are all mounted or sustained indirectly by and move with large horizontal gear, 65, and that the bearing, 74, and said shafts, 75, and 77, have a swinging movement independently of the said gear, 65, while traveling in a circular path therewith. The reason for this, is, that the vertical shaft, 77, carries the side polishing devices, and the latter must follow the contour of the foot or shoe, consequently the shaft that carries these devices must be movable laterally while maintained in a vertical position to enable the polishing and paste applying brushes to keep close against the side of the shoe during their respective operations.

Above the bearing, 74, the machine is provided with a horizontal plate or table, 48, sustained by suitable supports, 49, which project vertically from the bed-plate, 2, hereinbefore referred to.

The table, 48, has a cut out portion in its top with a rigid cam plate in said cut out as shown in our said prior patent. This cam plate is flush with the top surface of the table and has position in the cut out portion thereof so as to form a cam slot, 87, between the edges of the cut out in the table and the cam plate. The shape of this cam slot, 87, resembles the outline of the bottom of the shoe and shoe-support, 85, and serves as a guide to direct the polish-applying and polishing brushes as they travel in a circuit about the shoe as will presently be described. The vertical shaft, 77, heretofore described projects up through the cam slot and its projecting end carries a frame, 88, see Figs. 1, 11, 23 and 27. At the lower end the yoke frame, 88, is provided with a horizontally-projecting arm, 89, which trails behind it and which carries a roller, 90, on its under side that travels in the cam slot and thereby serves to direct the yoke frame as it travels in a circuit about the shoe.

A swinging bracket frame 91, shown in Figs. 1, 11, 23 and 24 of the drawings, carries the polish-applying mechanism, and is mounted on and projects horizontally from the vertical shaft, 77, between the upper and lower horizontal portions of the yoke frame, and this swinging bracket also trails behind said shaft, 77, during its travel in a circuit about the shoe. A spring, 92, is coiled about the shaft, 77, and has one end attached to the swinging polisher bracket 91 and the action of this spring is to constantly push the bracket toward the cam-plate, 86, and also toward the shoe-support, 85, so that unless held away, this bracket would move inwardly to a position at the side of the shoe and support where polish would be applied to the shoe. The fact is, in actual practice, this polisher bracket during the entire polishing operation makes twenty circuits more or less around the shoe, but during only the second, third, fourth and fifth circuits more or less it is permitted to swing inwardly against the shoe to the polish-applying position. The devices for causing this swinging movement will presently be described.

In so far as above described the mechanism is the same both in construction and operation as that shown and described in said Letters Patent 1,055,979 hereinbefore referred to and on which the present invention is a direct improvement.

The swinging polisher bracket, 91, carries a vertical shaft, 93, best seen in Figs. 9, 11, 12, 13, 23 and 24, the upper end of which is provided with a polish-applying brush, 94. This brush revolves only while it makes its four contact circuits more or less around and in contact with the shoe, and during its travel for the remaining circuits it is idle. This shaft, 93, is tubular and carries a clutch member, 95, which has a vertical movement on the shaft, but is prevented from turning independently thereof by means of a horizontal pin, 96, that extends through said clutch member and has its ends projecting through vertical slots, 97, in the tubular shaft, 93. A short vertical stem, 98, is located in the tubular shaft and has its upper end attached to the pin, 96, which latter passes through it, and the lower end of said stem carries another cross-pin, 99, that projects through a lower slot, 100, in the said tubular shaft as clearly shown in Fig. 9.

The lower end of the tubular shaft, 93, seats in a bearing on the bracket, 91, and above said bearing said shaft is provided with a collar, 101, that has an annular groove, 102, about its circumference. The pin, 99, that passes through stem, 98, also has its ends engaging the collar, 101, so that said collar will be held against independent rotation about the shaft. A coiled spring, 103, encircles the tubular shaft between the collar and lower bearing and serves as a cushion for the collar when the latter is lowered on the shaft and to normally raise the collar.

The upper end of the tubular shaft carries a normally loose gear, 104, which has lugs, 105, on its lower side that depend over the clutch member, 95, but are normally out of engagement therewith and the polish-applying brush, 94, is carried on the shaft above the said gear, 104.

The bracket, 91, carries a support, 106, which has a perforation through which the tubular shaft, 93, projects. This support carries a bracket, 107, at one edge which latter has an upwardly-projecting pin, 108. By reference to Fig. 1 it will be seen that the pin, 108, extends vertically so that its upper end will have position in a horizontal plane where it may be made to contact with the vertical edge of a stop-plate, 109, that is rigidly sustained beneath the shoe-support, 85. In the drawings this pin, 108, is shown away from the stop plate, which position it takes after the polish has been applied to the shoe and the polishing operation is being carried on, but during the operation of applying the polish said pin is swung around until it contacts with the stop plate which latter prevents the polish-applying brush from being pressed too hard against the shoe. The operation of moving the polish-applying brush away from the shoe is also shown in our said prior patent and the means therein shown for accomplishing the movement is substantially the same as herein shown. Briefly stated, the operation is effected by the vertical movement of rods, 50, in the tubular supports,—the rods being shown in Figs. 2, 3 and 22. The lower ends of the rods, 50, project down through the base plate 2, and are connected to and are actuated by the forward ends of rock arms, 113, that are carried on a horizontal rock shaft, 112. The rock shaft, 112, carries an arm 245, which projects rearwardly therefrom and whose end has a roller 246, that enters a side groove 247, in a cam 248, on a horizontal shaft 249. This shaft also carries a gear 250, which is driven by a pinion 251, on a shaft 252. A gear 253, is also mounted on the said shaft 252, and is driven by a pinion 254, on the horizontal shaft 26, as clearly shown in Fig. 22 of the drawing. It will thus be understood that shaft 112, is rocked from shaft 26, by the intervening gears, cam and rock arm, and that when so rocked, the forwardly projecting arms 113, will be rocked to impart a vertical movement to rods 50, and thereby cause the sleeve 116, on the tubular support 84, for the foot rest to be raised or lowered as desired. In the drawing this sleeve is shown in the raised position so as to hold the polish-applying brush away from the shoe. The sleeve has a side support, 117, through which horizontal rods, 118, project.

The upper end of each vertical rod 50, even when said rod is depressed, has position in a horizontal plane above the cam plate 86, that guides the polishing devices in their circuit about the shoe, as seen in Fig. 22 of the drawing, and said rod-end is movable in the tubular extension 84, of the support 58. This tubular extension is provided with vertical slots 114, at diametrically opposite sides through which the ends of a horizontal pin 115, extend after passing through the rod. The sleeve 116, surrounds said tubular extension 84, and engages the projecting ends of the pin 115 and the sleeve has horizontal side supports 117, which sustain the reciprocable horizontal rods 118. These rods are loose in the side supports or brackets and may move longitudinally therein while the rods and sleeve may both turn freely on the support, 84. The forward projecting ends of the rods, 118, are rigidly attached to a cross-bar, 119, see Figs. 1, 11, 13, and 27, which holds the rods rigidly with respect to each other, and which has position in a horizontal plane between the upper and lower arms of the frame, 88. A bracket 121, is slidable vertically on a rod 120 that is carried by frame 88, and said bracket pivotally connects the cross-bar 119, so that when the vertical rod, 50, is raised or lowered, the horizontal rods, 118, cross-bar, 119, and bracket, 121, may also be raised or lowered. It is this vertical movement of the cross-bar and bracket that causes the frame 91, and the polish-applying brush, 94, to swing toward or away from the shoe.

The vertically movable bracket, 121, is provided with an arm, 123, which carries a lug or pin, 124, at one side and a cam plate, 125, is mounted at the side of the swinging bracket frame, 91, which cam plate curves around and projects over said lug or pin as shown in Figs. 11 and 13. It is to be understood therefore, that when the bracket, 121, is raised, the pin, 124, will contact with the inclined surface of the cam plate, 125, and cause said plate to move laterally or swing away from the bracket, and as said plate is rigid on the swinging bracket frame, 91, the latter and all the polish-applying devices carried by it, including the shaft, 93, and brush, 94, will be swung away from the bracket, 121, and thus throw the polish-applying brush out of contact with the shoe. This movement is made against the action of the coiled spring, 92, and this condition will prevail so long as the vertical rod, 50, is held up or elevated by the lever, 113, which in the present instance is during about sixteen revolutions or circuits more or less, of the polisher mechanism about the shoe. While the polish-applying brush, 94, is held away from the shoe it is desirable to stop its revolution and prevent the feeding of paste from the paste receptacle, 126, when not in actual use. This same movement of the polish-applying brush toward and from the shoe is effected in our said Letters Patent 1,055,979 by the same means as herein set forth. The construction however of and means for feeding the polish is one of the features of this invention and the feeding of polish is effected in such manner that the polish may be collected by both the side and toe polish-applying brushes, as will presently be described.

To stop the revolution of the polish-applying shaft, 93, we provide a lever, 129, which is pivoted to the side of bracket, 91. This lever has one end that projects into the circumferential groove, 102, of the collar, 101, on the shaft, 93, and its other end extends upwardly and projects over a pin, 122, on the vertical part of frame, 88, as seen in Fig. 13. By this means when the bracket, 91, swings outwardly and away from the shoe, the upper end of the lever, 129, will be operated to lower the collar, 101, and stem, 98, and draw the clutch member, 95, down and away from the lugs, 105, on the bottom of gear, 104, as shown in Fig. 9, and thus the shaft, 93, will cease to revolve. The reverse of this operation takes place when the bracket, 91, is swung inwardly toward the shoe.

The side polisher brush, 130, is mounted on a vertical shaft, 131, which is carried in a swinging bracket, 132. This bracket is pivotally mounted on the vertical shaft, 77, and the upper end of the latter carries a gear, 133, which meshes directly with a gear, 134, on the polisher brush shaft, 131, and drives the latter. A coiled spring, 135, about shaft, 77, presses the bracket, 132, and polisher brush toward the shoe support. A plate, 136, is carried on the shaft, 77, and has a roller, 137, which travels in the cam slot, 87, and the upper side of said plate is provided with a vertically-projecting lug or stop, 138, against which a downwardly-extending lug, 51, on bracket, 132, will contact and thereby limit the movement of said bracket in a direction toward the shoe, all as shown in Fig. 11. A bracket, 139, at the upper end of the shaft, 77, and beneath the gear, 133, has bearings in which two meshing idler gears, 140, and, 141, are mounted. The gear, 140, meshes with and is driven by gear, 133, while gear, 141, meshes with and drives the gear, 104, on the polisher shaft, 93. By this means shaft, 93, and shaft, 131, are both driven from shaft, 77.

From the foregoing explanation it is to be understood that the side polishers and side polish-applying brushes are arranged to make an orbital movement about the shoe support and that the toe-polishing fabric is raised and lowered with respect to the toe to polish the latter when lowered and to be out of the path of the side polishers when elevated, so said side polishers may pass around the toe. During these operations it is necessary to supply the polish and apply it to the shoe and to do this most effectively we have provided independent polish-applying devices for the side and toe and have conceived a plan for feeding the polish so that both the side and toe polish-applying devices may be supplied. The construction and operation of these novel devices will now be explained in their order,—reference being made particularly to Figs. 11 to 18 of the drawings.

The support, 106, which is carried by the swinging bracket, 91, sustains the polish receptacle, 126, having a cylindrical lower portion, 150, which is closed by a bottom. This bottom has a central perforation through which the lower end of a screw-threaded stem, 151, projects. The lower projecting end of this stem carries a ratchet-wheel, 152, which is keyed to the end of the stem by means of a screw, 153, shown in detail in Fig. 15. The stem, 151, extends vertically in the cylinder and passes through a circular head, 154, with which it has threaded engagement so that when the ratchet wheel and stem are turned the head, 154, will travel thereon. A rib or narrow bar, 155, is provided on the vertical interior wall of the cylinder and the head, 154, is provided with a circumferential notch, 156, through which the rib or bar extends so that the head will be held by the said rib or bar and prevented from turning in the cylinder when the stem is turned.

The upper end of the cylinder is provided with exterior circumferential screw threads to which the head-part, 157, of the receptacle is attached. A worm feed screw, 158, extends across the upper end of the cylinder and stem therein and said worm screw has a stem, 159, at one end that enters a bearing, 160, in the wall of the receptacle head. The other end of the worm screw carries a disk or plate, 161, which has ratchet teeth, 162, around its circumference. This disk or plate snugly fits a side opening, 163, in the receptacle. A plurality of perforations, 164, are provided in the disk or plate, 161, through which the polish material may be forced as will presently be explained. One or more perforations or passages, 165, are provided in the head which extend upwardly and open on a flat horizontal table or surface, 166, at the upper outer side of the head. It will thus be seen that the perforations, 164, in the disk plate extend horizontally while the perforation or passage, 165, extends vertically.

By reference to Fig. 12 it will be noted that the polish receptacle has position at one side of the polish-applying brush, 94, where the circumference of the latter may wipe over the perforations, 164, in the disk or plate, 161, so as to collect polish that is forced through the said perforations in said disk and apply it to the side of the shoe. In order to prevent the polish from being thrown from the brush we provide a curved guard plate, 167, which partly encircles the brush.

It is desirable that the polish be fed from the receptacle only when the brush, 94, is in revolving contact with the shoe and as the polisher shaft, 93, only revolves at such times, we make use of the motion of said shaft to actuate the feed devices in the receptacle.

It has been explained that collar, 101, on shaft, 93, see Figs. 11 and 12, is raised to operate the clutch, 95, and cause the shaft, 93, to revolve as the brush is swung toward the shoe. By referring to Fig. 12, it will be seen that said collar has a circumferential lug, 168, at its upper edge which is carried around as the collar revolves with the shaft. As this lug is revolved (the collar being elevated at the time) it is brought into contact at each revolution with a lug, 169, on the lower end of a lever, 170, that is pivoted to the side of the polish receptacle by means of a screw stud, 171. This lever projects through a slot, 172, in the support, 106, as shown in Figs. 16 and 17, and the lower end thereof turns laterally and carries the said lug, 169. This lower end of the lever also carries a pawl, 173, which projects toward and engages the ratchet teeth on the wheel, 152, at the bottom of the polish receptacle. It will thus be seen that each time the elevated collar, 101, makes a revolution, the lug, 168, thereon will strike lug, 169, on the lever, 170, and swing the latter thus causing the pawl, 173, to engage a ratchet tooth on the wheel, 152, and move the latter one step.

This movement of the wheel, 152, is very slight in practice but is sufficient in view of the fact that at each revolution of shaft, 93, the wheel is moved a step, consequently the head, 154, gradually moves vertically in the polish receptacle and on the stem, 151, and presses the polish toward the worm screw, 158.

The upper end of lever, 170, carries a pawl, 174, which engages the ratchet teeth, 162, on the disk or plate, 161, so that each time the lower end of the lever is actuated by the lug on the collar, 101, the upper end of the lever will move pawl, 174, and thus turn the disk, 161, one step. The worm screw is rigidly connected to the disk and consequently the turning of the latter will actuate the worm and force the polish toward the disk and through the perforations, 164, to the exterior where the polish-applying brush, 94, may wipe it off and apply it to the shoe. A spring, 175, keeps the pawl, 174, in engagement with the teeth of the disk, 164, and another spring, 176, serves to return the lever, 170, to its normal position after it has been actuated by the lug, 168, on collar, 101. It is obvious that the only escape for the polish material from the receptacle is through the perforations, 164, in the disk and through the perforation or passage, 165, to the flat table or surface, 166, on top of the head, 157, consequently when the machine is at rest the polish material left in said perforations and passages effectively seals the latter and prevents the air from injuriously affecting the polish. It is also obvious that the instant the shaft, 93, comes to a stop the feeding of polish will also be discontinued because the lug, 168, on collar, 101, will be idle.

During the polish-feeding and also the polishing operations the polish receptacle is carried around the shoe support and beneath the toe-polisher and while it is passing around the toe we propose to collect the polish that has been fed to the flat table or surface, 166, of the head and apply that polish to the toe of the shoe. This mechanism is also a feature of the present invention and will therefore now be described.

By referring to Figs. 1 and 2, it will be noted that the horizontal shaft, 26, at the rear of the machine projects beyond one of the side frames, 1, of the machine and that the outer projecting end thereof carries a crank, 177, which turns continuously with said shaft. A connecting rod, 178, has its rear end pivotally connected with the crank and extends forwardly therefrom to the front of the machine. The forward end of this connecting rod has a notch, 179, in its lower edge which rests upon a horizontal pin, 180, in the side and lower end of substantially a vertical rock-arm, 181. The rock-arm depends from a horizontal rock-shaft, 182, which is carried in bearings, 183, on the horizontal bar, 18, that is sustained by the vertical rods, 11,—the upper end of the rock-arm being rigidly connected to one end of the rock-shaft and depending therefrom, as clearly seen in Fig. 7.

The shaft, 182, extends across the front of the machine below the table, 12, of the toe polisher and said shaft carries an upwardly-projecting rock arm, 184, for each toe polisher. As there are two toe-polishers there will be two rock-arms, 184, but as both of these devices are alike in construction only one of them will be described. The lower end of the arm, 184, has a sleeve, 185, that receives the shaft, 182, and said sleeve is provided with a pin or lug, 186, to which one end of a coiled spring, 187, is attached. The other end of the spring is connected to the cross-bar, 18, so as to exert a continuous pull that will yieldingly hold the rock shaft, 182, in a position to keep the lower end of rock-arm, 181, swung rearwardly when the toe polisher is not in action and thus the pin, 180, on the lower end of said arm will be retained in a position where the notch, 179, of connecting rod may readily engage it, as will presently be more fully explained.

The upper end of rock-arm, 184, see Figs. 7, 8, 19, 20 and 21, is provided with a head, 188, having a vertical slot, 189, thereon to which one end of a brush-supporting arm, 190, is adjustably connected by means of a bolt, 191, that passes through said slot. The end of this arm is provided with an adjusting screw, 192, that passes therethrough so that its end may impinge against the under side of the head, 188, and by turning said screw the arm may be rocked more or less with respect to the head to effect an adjustment and the arm 190 yieldingly held in the adjusted position by means of a spring, 193, that extends between the brush arm, 190, and the rock arm, 184, as clearly seen in Fig. 21.

The inner end of the brush-supporting arm 190, carries a revoluble brush, 194, that is pivotally connected thereto by means of a suitable pin or screw, 195. This screw carries a ratchet wheel, 196, at the upper side of the arm, 190, and said wheel, screw and brush are all rigidly connected so that the turning of one will effect a revolution of the others. A reciprocable rod, 197, is sustained in suitable bearings, 198, on the upper side of the brush arm and the inner end of said rod is connected to a pawl, 199, that engages the teeth of the ratchet wheel, 196. A spring, 200, serves to keep the pawl in engagement with the teeth. A locking pawl, 201, serves to prevent backward rotation of the ratchet wheel when the pawl, 199, is returned to take a fresh hold on the teeth. The outer end of the rod, 197, is provided with a hook, 202, and a chain or equivalent device, 203, has one end engaging the said hook and its other end secured to an angle bracket, 204, on the front edge of the table, 12.

From the foregoing explanation, it should be understood that the crank, 177, will reciprocate rod, 178, which latter will oscillate shaft, 182, through arm, 181, and thus swing arms, 184, back and forth beneath the table, 12. As the upper ends of arms, 184, carry the brush arms and brushes, 194, the latter will be moved to and from the toe-support, 85, on which the shoe to be polished is placed. The chains, 203, are of such length as to become taut just before the arms, 184, complete their inward swing and at this time the brushes, 194, will be in contact with the toe of the shoe so that the slight further movement of the arms, 184, and also the brush arm, 190, will cause a pull on the chains, 203, which will hold the rod, 197, and cause pawl, 199, to hold the ratchet wheel teeth. Thus such further movement will turn the ratchet wheel and brush while the latter is in contact with the toe of the shoe and any polish that may have been collected by the brush will be spread on the shoe toe.

A spring, 205, is placed on the rod, 197, so that it will operate to return the rod and pawl after it has been moved to rotate the brush.

The toe polish brush, 194, gathers the polish from the flat surface or top, 166, of the polish receptacle as it wipes over the latter,—it being recalled that said polish receptacle travels about the shoe support and turns around the toe end of the latter. During this passage around the toe the polish-receptacle has position directly beneath the toe-polish applying-brush, 194, and the latter receives the polish that has been fed upwardly through passage, 165, and conveys it to and spreads it on the toe of the shoe. It will thus be seen that the toe of the shoe will receive the polish material from a brush that is separate from the brush that applies the polish material to the side of the shoe, consequently the toe portion of a shoe, which is the most conspicuous part, will be ready to be polished by the reciprocating toe-fabrics.

After the operation of applying the polish material to the toe it is important to withdraw the toe polish brush, 194, so it will cease to contact with the toe of the shoe during the polishing operation, otherwise said brush would continue to rub on the toe and prevent the polishing fabrics from burnishing or polishing. To do this we have provided means to disconnect the connecting rod, 178, and pin, 180, at the lower end of the rock-arm, 181, which will now be explained, reference being made to Figs. 1 to 6 of the drawings. A rock shaft, 206, extends horizontally between the side frames, 1, of the machine and below the bed plate, 2, and said shaft projects at the side of the machine adjacent to the connecting rod, 178, and the said projecting end carries an arm, 207, that has a roller, 208, at its free end. The position of this arm and roller is such that the roller will normally be below the lower edge of the connecting rod and to the rear of the notch, 179. If therefore, the shaft, 206, is rocked so as to raise arm, 207, the roller will engage the bottom edge of the connecting rod 178 and lift the notched end thereof from the pin, 180, and the further reciprocations of the rod, 178, may continue but without actuating the arm, 181, or rock-shaft, 182, consequently the toe polish brush will remain idle until the connecting rod and pin are again engaged. A hook, 209, at the side of the machine serves as a keeper to prevent the notch-end of the connecting rod from moving laterally and dropping off the roller on which latter the rod rolls as it is reciprocated. When the rod, 178, and pin, 179, are disengaged the springs, 187, will hold the rock-shaft, 182, in a position where the arm, 181, and said pin, 180, may be again engaged by the connecting rod by the lowering of arm, 207.

The devices employed to rock the shaft, 206, will now be explained, particular reference being made to Figs. 3 to 6 inclusive of the drawings. It is obvious that the various operations of the machine must take place in proper time and in the present machine it has been found desirable to provide a few revolutions for the application of the polish material; then to allow the side polishers to polish the sides and ends of the shoes for a certain number of revolutions while holding the toe polishing fabrics away from the toe and finally to raise and lower the toe-polishing fabrics to complete the toe polishing operation. All of these operations are effected through the cam, 27, on shaft, 26, which revolves throughout the operation of the machine as in our said prior patent. By reference to Figs. 3 and 4, it will be noted that horizontal shaft, 22, carries a ratchet wheel, 210, which is loose on said shaft, and one side of which is provided with a cam lug, 211. A ratchet lever, 212 has a sleeve portion, 213, that embraces the shaft, 22, at the side of the ratchet wheel and said lever has a pawl, 214, which engages the teeth of the ratchet wheel whereby to turn the latter one step or tooth at a time. A spring, 215, serves to hold the free end of the lever, 212, up and thereby keep the pawl, 214, in engagement with the circumference of the ratchet wheel. A locking pawl, 216, prevents a reverse movement of the ratchet wheel as pawl, 214, returns to engage another tooth. The large cam, 27, is provided with a lug, 217, at one side and near the periphery which lug at each revolution of the cam strikes the free end of lever, 212, and raises the same whereby to move the ratchet wheel one tooth at a time. The number of teeth on the ratchet wheel correspond to the number of revolutions made by the cam, 27, through a complete operation, thus the ratchet wheel will be turned one revolution while the cam, 27, makes a revolution for each tooth on the ratchet wheel.

Above the ratchet wheel there is a depending bracket, 218, which is secured to the bottom side of the bed plate, 2, and the lower part of said bracket has a sleeve, 219, through which the shaft, 22, projects. Above the shaft, 22, the bracket has a tubular boss, 220, in which a horizontal pin, 221, is loosely fitted so that both of its ends will project. One end of this pin has position at the side of the ratchet wheel, 210, while the other end thereof is in contact with the side edge of a pivoted lever, 222, as clearly seen in Figs. 3, 5 and 6. The lever, 222, is pivoted between its ends at, 223, on the bracket arm, 29, and the end thereof that contacts with pin, 221, is provided with an elongated slot, 224, into which a depending pin, 225, on the end of a lever, 226, projects. The lever, 226, is pivotally sustained from a depending post or stud, 240, at the under side of the bed plate, 2, as shown in Fig. 4, and said lever has a beveled cam block, 227, at its free end which projects over a knob, 228, that is carried on a collar, 229, on rock-shaft, 206. A spring, 230, serves to draw the cam-block end of lever, 226, to one side of the knob, 228, and normally allow the latter to remain in its uppermost position.

From the foregoing explanation it will be seen that as the ratchet wheel, 210, turns step-by-step there will be a time in the operation when the cam-lug, 211, at the side thereof will wedge between the side of the ratchet wheel and the end of the pin, 221, thus pushing the pin against lever, 222, and moving the latter so that the cam-block, 227, at the front end thereof will rock the shaft, 206, and hold it in the rocked position until the said cam-lug, 211, passes beyond the pin, 221. It is this movement that disengages the connecting rod, 178, and pin, 180, and cuts out the toe-polish brushes while the toe polishing fabrics effect a polish of the toe. Also by this same mechanism of ratchet wheel, 210; pin, 221, and lever, 222, the vertical movement of the table 12, is brought into action when the toe-polish brushes are cut out as will now be explained.

The rear end of the bracket arm, 29, has a sleeve, 231, in which a pin, 30, is carried so as to extend crosswise of the arm, as shown in Figs. 3, 4 and 10, of the drawings. At the upper side the sleeve has a vertical slot, 232, and the rear end of lever, 222, has position over said slot and is provided with a vertical pin, 233, that passes down through the vertical slot and enters a circumferential groove, 234, in the pin, 30, so that when the forward end of lever, 222, is operated by the pin, 221, the rear end will actuate the pin, 30, and move it in one direction or the other through the sleeve, 231. One end of the pin 30, is provided with a roller, 235, the position of which is such that when the ratchet-wheel cam-plate, 211, pushes pin, 221, against lever, 222, the roller, 235, on pin, 30, will be projected into the side groove, 28, of cam, 27, and thereby operatively connect the bracket arm, 29, with the cam, 27, to rock shaft, 22, and thus raise and lower the table, 12, of the toe-polisher mechanism. The operation takes place only after the toe polish brushes have applied the polish material to the toe of the shoe and the actual polishing of the toe is to be carried on.

A bracket, 236, is carried on the side frame of the machine and has a circular opening, 237, therein which registers with and receives the pin, 30, on the bracket-arm, 29, when the latter is at rest so as to support the weight of the table, 12, and other toe-polishing devices at the front of the machine and keep them in the elevated position while the toe-polish brushes are in action.

When the pin, 30, is in either the groove, 28, of the cam, 27, or the opening, 237, of bracket, 236, we have found it difficult in practice to retract the pin because of the weight it was sustaining and to overcome this we provide a roller, 238, on the upper side of sleeve, 231, and further provide a cam plate, 239, on the side of cam, 27, so that when the cam plate, 239, passes over the roller, 238, it will slightly press the same down thus momentarily overcoming the weight on the arm, 29, and enabling the pin, 30, to be readily moved.

From the foregoing explanation it is to be understood that the present invention relates to the novel mechanism whereby the polish-applying material is fed for both the side and toe polish-applying devices; to the mechanism for actuating the toe polish-applying devices and to the mechanism which starts and stops the toe polish-applying mechanism.

The particular means for effecting a polishing after the polish has been applied is immaterial and in reality is almost precisely like that shown in our said Letters Patent 1,055,979 and for this reason it has been deemed unnecessary to detail these various features of our said prior patent.

Having thus described our invention what we claim and desire to secure by Letters Patent is,—

1. A shoe polishing machine having a support, a polisher for the sides of the shoe while on the said support and with means for applying polish material to the sides of the shoe in combination with a toe polishing fabric; means for operating the latter across the toe of the shoe; means for moving the polishing fabric to and from the toe of the shoe; a brush movable between the toe-polishing fabric and the toe-end of the shoe to apply polish material to the toe of the shoe,—said brush being independent of the side polish-applying means and means for supplying polish material to the side and toe polish-applying means.

2. A shoe polishing machine having a shoe support with a polisher for the sides of the shoe and with means for moving the said polisher around the shoe support in combination with a toe-polishing fabric; a brush movable between the toe-polishing fabric and the toe-end of the shoe support for applying polish material to the toe of a shoe; means for reciprocating the brush across the toe and means for moving the toe-fabric and brush vertically with respect to the shoe support.

3. A shoe polishing machine having a shoe support with a polish-applying and polisher brushes movable around the support in combination with a table in front of the shoe support; a toe-polisher carried by the table; a brush sustained in front of the shoe support and movable over the toe-end thereof; means for holding the toe polisher idle while the last-named brush is being operated and means for holding the brush idle while the toe-polisher is operating.

4. A shoe polishing machine having a shoe support, a side polisher, a toe polisher and a polish applying device for the side of the shoe in combination with a separate polish-applying device for the toe of the shoe, and means movable with one polish-applying device and passing the other polish-applying device for supplying polish material to both of said devices.

5. A shoe polishing machine having a shoe support with a side polisher, a toe polisher and a polish applying device for the side of the shoe in combination with a separate polish-applying device for the toe of the shoe, and a polish receptacle having outlets in two sides thereof for the escape of polish whereby to supply polish material to both applying devices.

6. A shoe polishing machine having a shoe support with a side polisher movable along the sides of the said support and also having a polish-applying brush traveling with the side polisher in combination with a polish receptacle movable with the said polish-applying brush; means for automatically feeding polish to said applying brush; a toe polish-applying brush movable in a plane over the path of said receptacle to also gather polish from the latter and a toe polisher movable vertically over the toe of the shoe.

7. A shoe polishing machine having a side polisher, a toe polisher and a polish-applying device for the side of the shoe all of which are movable around the shoe to be polished, in combination with a separate polish-applying device for the toe of the shoe; means for operating the toe polish-applying device simultaneously with the movement of the side polisher and means for moving the toe polish-applying device out of the path of the side polisher to permit the latter to pass.

8. A shoe polishing machine having a shoe support and a side polisher at the side of the support in combination with a vertically movable toe-polisher; a brush sustained beneath the toe-polisher; means for reciprocating the said brush beneath the toe-polisher; means for periodically holding the brush retracted and away from the toe and means for lowering the toe polisher onto the toe while the brush is held retracted.

9. A shoe polishing machine having a shoe support with a side polisher at the side of the support in combination with a vertically movable toe-polisher; a brush sustained beneath the toe-polisher; means for reciprocating the said brush beneath the toe-polisher; means for giving the brush a rotating movement to spread the polish on the toe; means for holding the brush retracted and means for bringing the toe polisher into contact with the toe.

10. A shoe polishing machine having a shoe support with a polisher for the side of the shoe in combination with a toe polisher; a toe polish-applying device in front of the shoe support; a rock-shaft; means connecting the said polish-applying device with the rock-shaft; means for rocking said shaft; means for moving the toe polisher into position over the toe and means for automatically stopping the rock shaft while the toe polisher is operating on the toe.

11. A shoe polishing machine having a shoe support with a polisher for the side of the shoe in combination with a toe polisher; a toe polish-applying device in front of the shoe support; a rock-shaft; a crank; a connecting rod; means coacting between the connecting rod and the rock shaft to rock the latter and means for disconnecting the said rod to render the rock shaft inoperative.

12. A shoe polishing machine having a shoe support with a polisher for the side of the shoe in combination with a toe polisher; a toe polish-applying device in front of the shoe support; a rock-shaft; a crank; a connecting rod; an arm carried by the rock-shaft and detachably engaging the connecting rod; means for disengaging the connecting rod from the said arm to allow the latter to remain idle and means for moving the toe polisher onto the toe of the shoe after the connecting rod has been disengaged.

13. A shoe polishing machine having a shoe support with a side polisher for the shoe in combination with a toe polisher; a rock-shaft in front of the shoe support; an arm carried by the rock shaft; a toe polish-applying device carried by said arm; means for supplying polish material to the toe polish-applying device; means for rocking the shaft to swing the toe polish-applying device to and from the toe; means for holding the toe polish-applying device away from the toe after applying polish thereto and means for actuating the toe polisher.

14. A shoe polishing machine having a shoe support with a polisher for the side of the shoe in combination with a polisher for the toe of the shoe; a rock-shaft having an arm; a toe polish-applying brush carried by said arm; means for rocking the shaft to move the polish-applying device over the toe and means for turning the brush while on the toe to distribute the polish thereon.

15. A shoe polishing machine having a shoe support with a movable side polisher for the shoe in combination with a polish receptacle moving with the side polisher; a toe polisher; a polish-applying device for the side of the shoe; a polish-applying device for the toe of the shoe and means for moving the toe polish-applying device against the said polish receptacle to collect polish therefrom and apply it to the toe of the shoe.

In testimony whereof we affix our signatures in presence of two witnesses.

HERBERT R. OLIVER.
GEORGE P. OHLGART.

Witnesses:
CHAS. B. MANN,
G. FERD VOGT.